No. 745,236. PATENTED NOV. 24, 1903.
O. R. PFAU.
LIQUID METER.
APPLICATION FILED APR. 4, 1903.
NO MODEL. 2 SHEETS—SHEET 1.
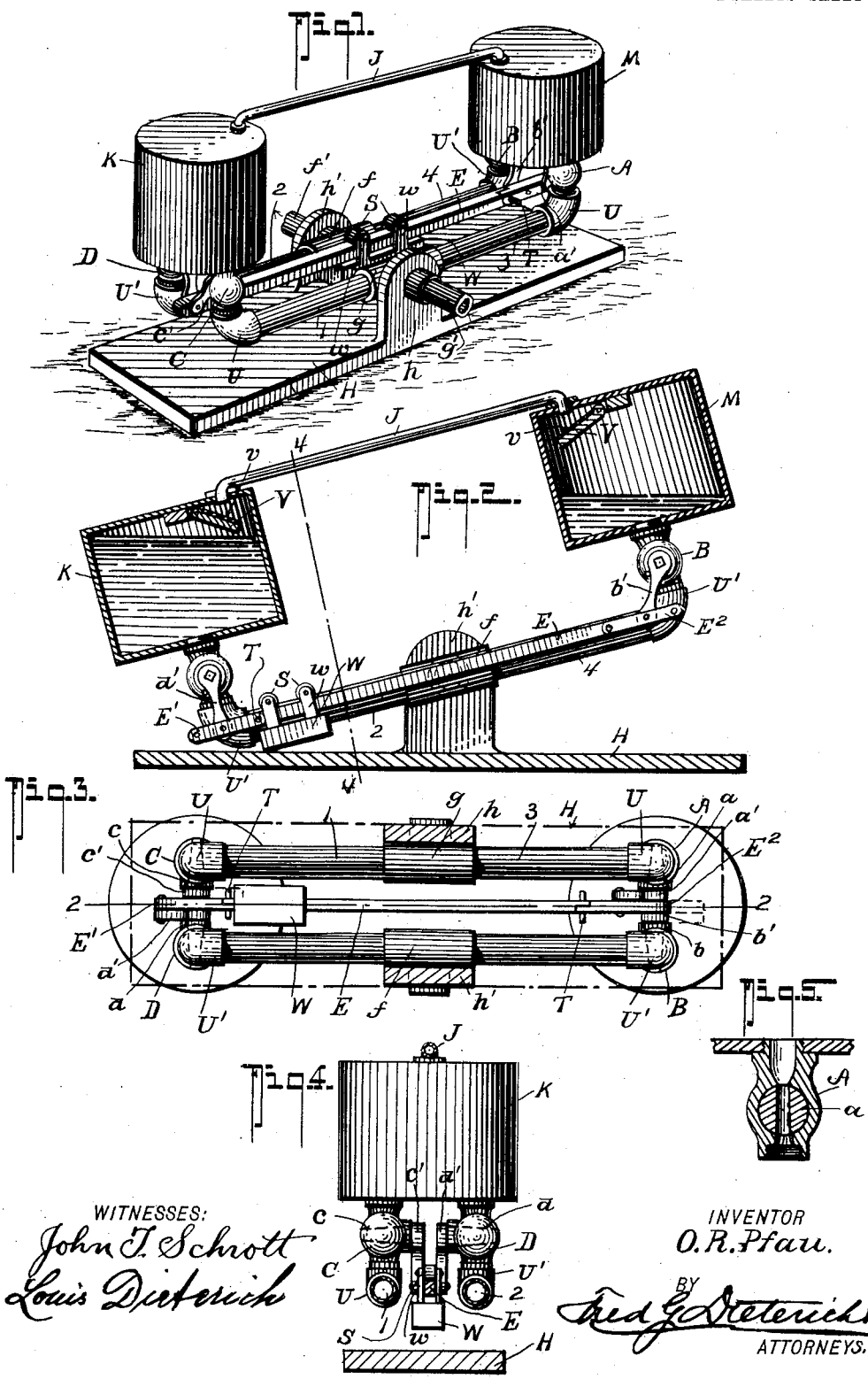
WITNESSES:
John T. Schrott
Louis Dieterich
INVENTOR
O. R. Pfau.
BY
Fred G. Dieterich
ATTORNEYS.

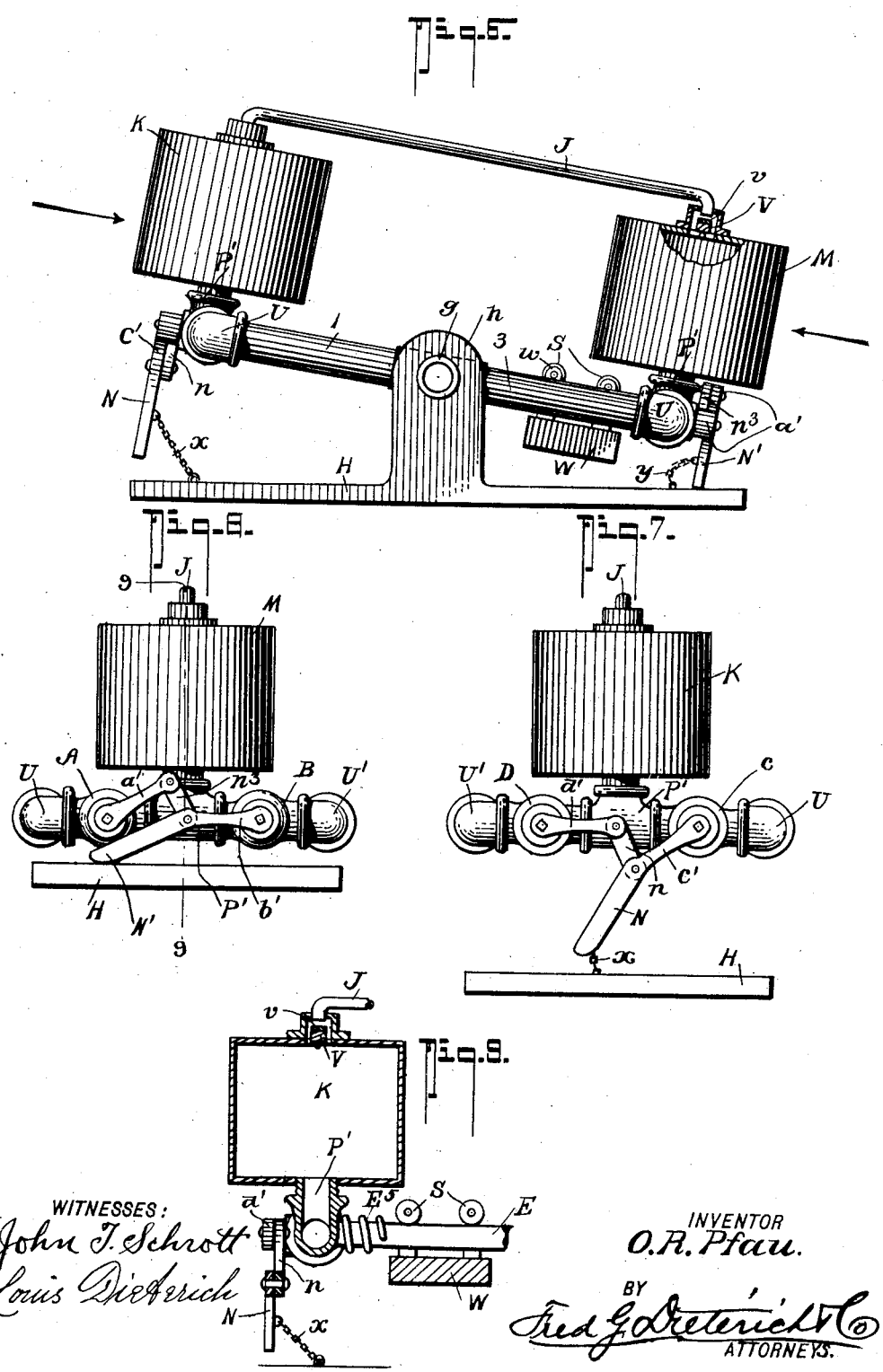

No. 745,236. Patented November 24, 1903.

UNITED STATES PATENT OFFICE.

OTTO R. PFAU, OF CHICAGO, ILLINOIS.

LIQUID-METER.

SPECIFICATION forming part of Letters Patent No. 745,236, dated November 24, 1903.

Application filed April 4, 1903. Serial No. 151,151. (No model.)

*To all whom it may concern:*

Be it known that I, OTTO R. PFAU, residing at Chicago, in the county of Cook and State of Illinois, have invented a new and Improved Liquid-Meter, of which the following is a specification.

My invention is in the nature of a new and improved apparatus for measuring liquid, and it more particularly refers to that type of liquid-meters in which is included tilting or oscillating holders; and it primarily seeks to provide an improved liquid-meter of the character stated embodying a simple and economical arrangement of parts easily adjustable and adapted to operate in a positive and accurate manner.

In its generic nature my invention comprehends a pair of tank or holding vessels, valved inlet and outlet pipes joined with the said tanks and pivotally supported between the tanks, and valve devices for alternately opening and closing the opposing tanks as they move to their lowermost or depressed positions and to simultaneously open the elevated tank as the depressed tank is lowered or closed off from the intake or offtake pipe.

In its more complete nature my invention includes a peculiar arrangement of feed and offtake pipes and valved intakes and outlets for said tanks coöperatively joined with each other, a shiftable member controlled in its alternate movements by the oscillation or tilting action of the two joined tanks for closing the intake-valves to the tanks; and in its still more subordinate features my invention consists in certain details of construction and peculiar combination of parts, all of which will hereinafter be fully explained and specifically pointed out in the appended claims, reference being had to the accompanying drawings, in which—

Figure 1 is a perspective view of my construction of liquid meter or measuring apparatus. Fig. 2 is a longitudinal section on the line 2 2 of Fig. 3. Fig. 3 is an inverted plan view thereof. Fig. 4 is a transverse section on the line 4 4 of Fig. 2. Fig. 5 is a detail sectional view of one of the cut-off valves. Fig. 6 is a side elevation of a modified form of my invention. Fig. 7 is an end view of one of the tanks K in its elevated position. Fig. 8 is a similar view of the opposite tank in its lowermost position. Fig. 9 is a detail section on the line 9 9 of Fig. 8.

While my invention is especially adapted for measuring fuel-oil, I desire it understood that with slight material modifications of the parts hereinafter described it can be readily utilized for measuring water or any other liquid.

In the construction shown a pair of tanks (designated K M) having, for example, each a capacity of one gallon are coöperatively joined by the parallelly-disposed pipe-sections 1 3 and 2 4, the ones 1 3 being joined by a T-coupling $g$, which forms a journal-bearing engaging with the bracket member $h$ of the support H, to which the intake or feed pipe $g'$ discharges, and the other pipe-sections, 2 4, are similarly joined by a T-joint $f$, which forms a journal for engaging with the bracket $h'$ of the support H and with which the offtake or discharge pipe $f'$ connects, as clearly shown in the drawings.

The outer ends of each of the pipe-sections 1 3 and 2 4 have elbows U and U′, and the elbows U, which connect with the intake-pipe section 1 3, are joined with the valve-casings A C, connected, respectively, with the tanks M K, and the said casings A and C have valves $a$ $c$, provided with cranks or turning-handles $a'$ $c'$, which are journaled with a valve-link or coupling-bar, to which are also connected the handles or cranks $b'$ $d'$ of the valves $b$ $d$, mounted within the valve-casings B D, with which the elbows U′ connect and which also join with the outlet-pipe sections 2 4, as shown.

W designates a tripper block or carriage provided with upwardly-extending forked brackets $w$ $w$, adapted to straddle the link or connecting rod E, and in the said brackets are journaled trolley-wheels S S, which engage and ride on the rod E for a purpose presently explained.

By referring now more particularly to Figs. 2 and 3, it will be noticed the member E has its end formed of pivoted sections E′ E², with which the valve-cranks C D and A B join, respectively, and the pivot-studs T project laterally from the member E whereby to form stops with which the carriage W engages on its lateral movements, and by reason of the impact or momentum force on the said carriage the bar E is caused to move forward in the direction of the movement of the carriage sufficiently to actuate the valves A B and C D.

J designates a vent-pipe the ends of which communicate with the upper or air space of the tanks K and M, and with each end of the said pipe coöperates a float-valve V, hinged on the under side of the tanks K and M, and the said valves each consist of a cork body having a rubber facing $v\ v$, whereby to automatically close up against the ends of the pipe J and cut off communication between the upper or air space of the tanks K and M when they fill, as will presently be more fully explained.

From the foregoing description, taken in connection with the accompanying drawings, it is believed the complete operation and advantages of my invention will readily appear to those skilled in the art to which it appertains.

Briefly stated, liquid flowing into the feed-pipe G (the valve A to the tank M being open) fills the tank M, and during this operation the air in the top of the tank M discharges through the pipe J into the tank K and forces the liquid down the said tank and through the valve D into the offtake F. As soon as the tank M becomes filled so the contents reach the valve V therein the said valve rises up and closes off pipe J from the tank M, which prevents any of the liquid flowing into the tank M passing into the tank K. Tank M then overbalances tank K and drops down, and thereby inclines the member E, causing the carriage W to move with some force in the direction of the tank M and to engage the stop T adjacent the tank M, and thereby shift the member E in the direction of the tank M, which movement also shifts the several valves $a\ b$ and $c\ d$ and simultaneously shuts off the inlet-valve $a$ to the tank M, the outlet-valve $d$ of the tank K, and opens up the valve $c$ to the tank K and a discharge-valve in the tank M, which operation then deflects the liquid feed into the tank K, while the contents of the tank M begin to discharge.

While I have not shown it, it is obvious that in practice a suitable indicator may be connected with the supporting-frame with which the carriage in its alternate movements engages to record the quantity of liquid that enters and discharges from the tanks K and M.

Slight changes in the details of construction may also be made without departing from the spirit of the invention or the scope of the appended claims. For example, my invention may be arranged with the parts coöperatively arranged, as shown in Figs. 6 to 9, in which the generic features are the equivalents of what is shown in the structure disclosed in Figs. 1 to 5 and in the construction shown in the said Figs. 6 to 9 the valves that control the inflow and the outflow of the fluid within the tanks are actuated by supplemental lever devices adapted to engage with the base H, upon which the apparatus is mounted.

In the form shown in Figs. 6 to 9 the outlets in the bottom of the tanks K and M join with a T pipe-coupling P', and with the said couplings P' join the valve-casings D and C and A and B, as clearly illustrated in Figs. 7 and 8, by reference to which it will be noticed that the stems of the valves A B have cranks $a'\ b'$ and the stems of the valves D and C have cranks $c'\ d'$, and the coincident ends of each set of cranks $c'\ d'$ and $a'\ b'$ are connected by the links $n$ and $n^3$, respectively. Formed lateral with the arms $b'\ c'$ are long lever-bars $n'$ N, and the said levers have their outer ends joined to short chains $x$, secured to the base N, which serve to limit the upward thrust of the tanks K and M and the rocking frame that forms a coöperative part of the apparatus. In this latter form of my invention the carriage W does not actuate the valves as it does in the other construction, (shown in Figs. 1 to 5;) but it is utilized as a counterpoise only.

The manner in which the modified form operates will be readily understood from Figs. 6 to 9, from which it is apparent that when the tank K is at the high point and ready to receive the liquid through the valve 6 when opened the lever member N is held by the chain $x$, joined therewith, while the carriage W is down against the tank M. As soon as the tank K fills it drops, and as it descends the lower end of the lever N strikes the base H, and by reason of its contact with the base N it closes the valve C and opens the valve D. During this movement of the tank K the lever H' on the other side is held by its chain 1$^y$ until the valve A is closed and the valve B is open, it being understood that the said operation is repeated so long as liquid is fed to the apparatus.

In the form shown in Figs. 6 to 9 the tanks K and M are joined by a vent-pipe J, the same as before, the ends of which are controlled by shock-valves V, arranged as shown in Fig. 9, in which is also shown a buffer-spring $E^5$, mounted on the carriage-bar E to take up the shock of the carriage in its reverse sliding movement.

The use of a carriage W arranged to operate as explained effects an advantageous result in my form of apparatus, for the reason that as one tank is being filled under pressure the air in the other tank is somewhat pressed, and by reason thereof it takes longer to discharge the liquid from the one tank than it does to fill the other tank, and hence the shiftable carriage or counterpoise facilitates a proper tilting action of the two tanks.

While I have described my invention as especially adapted as a liquid-meter, it is obvious that the same may be adapted without materially changing the structural combinations for measuring gas or other vaporous fluid.

Having thus described my invention, what I claim, and desire to secure by Letters Patent, is—

1. A measuring apparatus of the character stated, comprising a pair of tanks of like capacity, a balanced support in which is included valved inlet and offtake pipes communicating with the bottom of the tanks, a vent-pipe communicating with and connecting the tops of the tanks, a check-valve for each end of the vent-pipe and trip devices controlled by the rise and fall of the opposing tanks for actuating the valves in the tanks connecting the balanced pipes, said trip devices including a slidable weight.

2. In a measuring apparatus as described, in combination with a pair of tanks of like capacity, a fluid-inlet and a fluid-outlet pipe, the ends of which join with the said tank, a valve in each end of the two pipes, a vent in the upper end of each tank, said fluid-pipes being centrally fulcrumed, a separate trip mechanism joined with each set of valves for each tank and adapted to be shifted to open and close the valves connected therewith by the rise-and-fall movement of each tank, and the counterpoise operating in connection with the centrally-fulcrumed pipes, for the purposes described.

3. A liquid-measuring apparatus comprising a pair of like tanks each having a valved inlet and a valved outlet in the lower end thereof and a vent in the upper end, a float-valve within each tank for closing off the said vents, a single feed-pipe common to the inlets of both tanks, a discharge-pipe common with the outlet of both tanks, said pipes being fulcrumed at a point between the tanks, an automatically-operating valve-shifting means controlled by the rise and fall of the opposite tanks, said means including mechanism for shifting the intake and the offtake valves for each tank in alternate directions and in unison, substantially as shown and described.

4. A liquid-meter of the character described, comprising a suitable supporting-frame, two tanks, connections for balancing the tanks on the supporting-frame, each tank having a valved inlet and outlet and an air-vent, a single gravity-actuated trip adapted to be moved in alternate directions by the alternate rise and fall of the tanks and to thereby engage and shift the several inlet and outlet valves for the tanks, as set forth.

5. A liquid-measuring apparatus comprising a pair of like tanks each having a valved inlet and a valved outlet in the lower end thereof, a vent-pipe connected with the upper end of said tanks, a float-valve within each tank for closing off the said vent-pipes, a single feed-pipe common to the inlets of both tanks, a discharge-pipe common with the outlets of both tanks, said pipes being fulcrumed at a point midway the tanks, an automatically-operating valve-shifting means including a gravity-actuated member and connections joining the pair of valves for each tank, two opposite pairs of valves being adapted to be actuated by the said gravity-movable member, for the purposes described.

6. In a liquid-measuring means as described; a feed-pipe and an outlet-pipe, a tank at each end of the pipes, each tank having valved connections with the adjacent ends of the inlet and outlet pipes, a support, said inlet and outlet pipes being pivotally mounted on said support at a point midway the tanks, and shifting devices for the inlet and outlet valves for each tank arranged to move the valves alternately, and a gravity-actuated tripper movable with the tanks for engaging said shifting valves, for the purposes stated.

7. In a liquid-measuring means as described; the combination of a suitable support, an inlet and an outlet pipe, the two having a parallel relation and arranged in the same plane, and centrally pivoted on the support, a pair of tanks of like structure mounted one on each of the adjacent ends of the inlet and outlet pipes, a separate valved connection with each of said pipe ends, the stems of each coöperative pair of valves being projected at different angles, a single shifting member common to all of the valve-stems and connected thereto, a gravity-actuated tripper movable with the tanks and adapted to gravitate in the direction of the down-going tank and by such movement to actuate the single shifting member connected with the several valves whereby to reverse the positions of all of the valves, and the vent for each tank, substantially as shown and for the purposes described.

8. The combination with the support H, the T-joints $f$ and $g$ journaled thereon, the pipe-sections 1 and 3 connected with the joint $g$, the pipe-sections 2 and 4 connected with the joint $f$, and the elbow members U U' connected to the said pipes as shown, of the tanks K M, the valves $a$ $b$ and $c$ $d$ for controlling the inlets and outlets to the tanks, the pipe J communicating with the said tanks, a float-valve in each tank for cutting down the pipe J, the shifting bar E having pivoted ends E' E$^2$, the tank inlet and outlet valves having stems connected with the said ends E' E$^2$, the weight W, slidable on the member E and the stops T, one on each of the members E for engaging with the weight W, all being arranged substantially as shown and for the purposes described.

OTTO R. PFAU.

Witnesses:
FRANK G. HAJICEK,
FRANK HOUSIK.